US006499388B2

United States Patent
Schmed (10) Patent No.: US 6,499,388 B2
(45) Date of Patent: Dec. 31, 2002

(54) COFFEE MACHINE FOR BREWING COFFEE POWER PRE-PACKED IN A CARTRIDGE

(75) Inventor: Arthur Schmed, Ober-Dürnten (CH)

(73) Assignee: Fianara Interational B. V., Amsterdam (NL)

( * ) Notice: Subject to any disclaimer, the term of this patent is extended or adjusted under 35 U.S.C. 154(b) by 0 days.

(21) Appl. No.: 09/859,998

(22) Filed: May 17, 2001

(65) Prior Publication Data
US 2001/0052294 A1 Dec. 20, 2001

(30) Foreign Application Priority Data
Jun. 14, 2000 (CH) ................................. 1173/00

(51) Int. Cl.⁷ ................................. A47J 31/00
(52) U.S. Cl. ...................... 99/295; 99/302 R; 99/302 P
(58) Field of Search ................ 99/295, 302 R, 99/302 P, 280, 286, 287, 289 R, 297, 300

(56) References Cited

U.S. PATENT DOCUMENTS

| 2,899,886 | A | * | 8/1959 | Rodth | ......................... 99/295 |
| 3,878,772 | A | * | 4/1975 | Nordskog | ..................... 99/295 |
| 5,398,595 | A | * | 3/1995 | Fond et al. | .................... 99/295 |
| 5,472,719 | A | | 12/1995 | Favre | |
| 5,794,519 | A | * | 8/1998 | Fischer | ......................... 99/295 |
| 5,826,492 | A | * | 10/1998 | Fond et al. | .................... 99/295 |
| 5,897,899 | A | | 4/1999 | Fond | |

FOREIGN PATENT DOCUMENTS

| EP | 0 891 734 A1 | 1/1999 |
| FR | 2668451 | 4/1992 |

* cited by examiner

Primary Examiner—Reginald L. Alexander
(74) Attorney, Agent, or Firm—Maginot, Moore & Bowman (57) ABSTRACT

Proposed is a coffee machine for brewing coffee powder pre-packed in a cartridge. For perforating the cartridge, the bottom of the brewing chamber is provided with inclined perforator members which provide the cartridge with elongate slots that have a greater cross section than the cross section of the particular perforator member. A brewing chamber housing receives two chamber portions delimiting the brewing chamber. The upper chamber portion is adapted to vertically support the cartridge and biased by a spring. For closing the chamber, the brewing chamber housing is raised against a closure piston. The closure piston entering the brewing chamber moves the upper chamber portion against the force of the spring downwards towards the lower chamber portion. In the final position of the brewing chamber housing, the front portion of the cartridge is hydraulically sealed with regard to the rear portion of the chamber by sealing members. For brewing the coffee powder, the chamber is hydraulically subjected to an overpressure by the brewing water in such a way that the brewing water flows through the perforations into the interior of the cartridge. The front of the cartridge is perforated by a closure member provided with projections, such that the brewed coffee beverage can escape through the so created openings and flow to a beverage outlet.

11 Claims, 7 Drawing Sheets

COFFEE MACHINE FOR BREWING COFFEE POWER PRE-PACKED IN A CARTRIDGE

BACKGROUND OF THE INVENTION

The present invention refers to a coffee machine for brewing coffee powder pre-packed in a cartridge, comprising a perforator member for creating at least one opening in the cartridge.

PRIOR ART

In order to brew coffee powder pre-packed in a cartridge, up to now, mostly semi-automatic coffee machines are used in which the cartridge has to be inserted into a sieve holder with its cap facing downwards, whereby the sieve holder, thereafter, has to be manually fixed to the coffee machine. The coffee machine comprises a brewing pin member provided with radial outlet openings for the brewing water, located in the region of the portion pack holder fixing. The brewing pin member penetrates the bottom of the cartridge when the sieve holder is fixed to the coffee machine. The sieve holder itself is provided, at its bottom, with a plurality of projections. These projections penetrate the cap of the cartridge and perforate it, as soon as brewing water is fed to the sieve holder, whereby the cartridge is pressed against these projections under the influence of the hydraulic overpressure. At the consecutive brewing operation, the brewing water is fed into the cartridge by the brewing pin member, thus flowing through the coffee powder contained therein and escaping from the interior of the cartridge through the perforation in the cap. The freshly brewed coffee beverage can escape through outlets located at the lower side of the sieve holder. Such a coffee machine is disclosed, for example, in the document EP 0,891,734.

Practice has shown that the cross section of the brewing pin member that is relevant for the brewing water to escape the brewing pin member is relatively quickly decreased and fully blocked, respectively, under the influence of contamination. The reasons therefor are, for example, coffee fat, coffee particles as well as lime in the brewing water. However, with increasing contamination of the brewing pin member, the quality of the brewed coffee beverage decreases. From a hydraulic point of view, a further problem adhering to such brewing pin members is that so-called dead volumina occur in the interior of the cartridge such that portions of the coffee powder are not or insufficiently exposed to the flow of brewing water.

A further disadvantage of the mentioned brewing pin member consists in the fact that it leaves a relatively large puncture in the cartridge through which brewed coffee powder can escape once the brewing pin member is retracted, thus contaminating the coffee machine. This problem is particularly pronounced if the cartridge is put into the coffee machine such that the rear portion of the cartridge to be perforated extends vertically downwards, with the result that the brewed coffee powder can fall out of the cartridge under the influence of gravity, once the brewing pin member is retracted. Moreover, during the brewing operation and caused by the excess pressure in the interior of the cartridge, coffee powder escapes from the cartridge through a gap surrounding the brewing pin.

The document EP 0,521,187 discloses an apparatus for extracting closed cartridges. The apparatus is provided with an extraction head member, comprising a grid member for distributing the brewing water. The bottom side of that grid member is provided with protrusions adapted to perforate the cap of the cartridge to be extracted. The brewing water is supplied from the top through the cap of the cartridge. The latter one is bent under the influence of the pressure of the brewing water, with the result that an annular gap is created between the particular protrusion and the opening created therewith. Through that gap, the brewing water can get into the cartridge. The brewed coffee beverage is said to flow out downwards through the above mentioned outlet grid member. However, it is not quite clear how the brewed coffee beverage can escape the interior of the cartridge, because the protrusions extend through the therewith created openings, barely leaving any clearance between the particular protrusion and the opening created therewith.

OBJECTS OF THE INVENTION

Thus, it is an object of the invention to improve a coffee machine for brewing coffee powder pre-packed in a cartridge in such a way that it is of simpler design.

It is another object of the invention to improve a coffee machine for brewing coffee powder pre-packed in a cartridge in such a way that it is less susceptible to contamination.

It is a still further object of the invention to improve a coffee machine for brewing coffee powder pre-packed in a cartridge in such a way that it can be operated generally more reliably.

SUMMARY OF THE INVENTION

In order to meet these and other objects, the present invention provides a coffee machine for brewing coffee powder prepacked in a cartridge that comprises a perforator means for creating at least one opening in the cartridge containing the coffee powder. Thereby, the perforator means is adapted to create the opening in the cartridge bottom of the cartridge.

The perforator means has a cross sectional area that is smaller than the cross sectional area of the opening created in the cartridge bottom of the cartridge. Further provided are means for feeding brewing water under overpressure through the free cross sectional area of the opening in the cartridge bottom of the cartridge into the interior of the cartridge.

BRIEF DESCRIPTION OF THE DRAWINGS

In the following, an embodiment of the apparatus according to the invention will be further described, with reference to the accompanying drawings, in which.

DETAILED DESCRIPTION OF A PREFERRED EMBODIMENT

Figure 1:
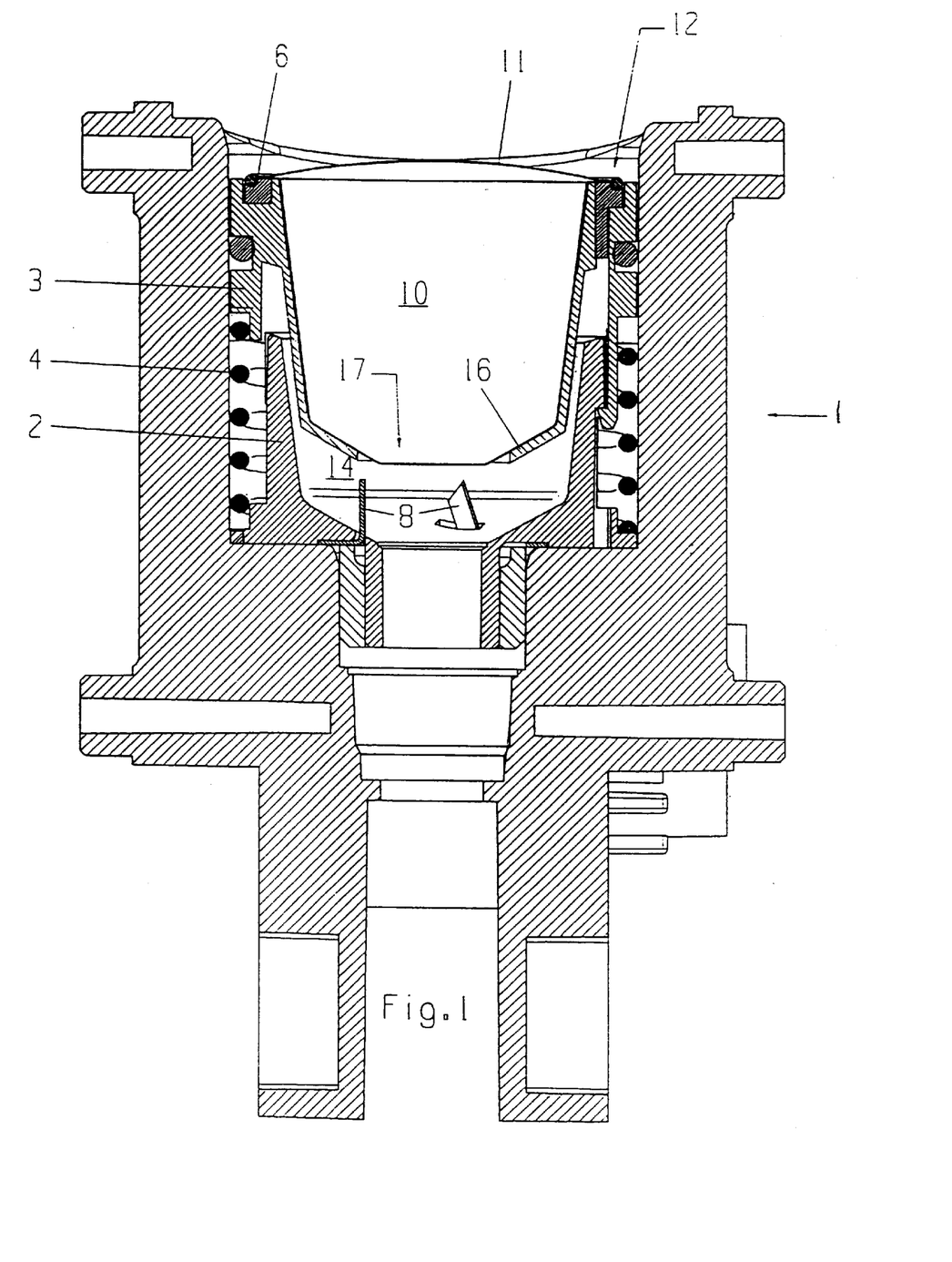
FIG. 1 shows a schematic view of a brewing assembly as well as of a cartridge in the initial state.

FIG. 1 shows a schematically illustrated brewing assembly which is in the present example part of a fully automatic coffee machine for brewing coffee powder pre-packed in a cartridge 10. The brewing assembly comprises a brewing chamber housing 1 in which are contained two chamber portions 2, 3 delimiting the real brewing chamber 14. The upper portion 3 of the brewing chamber 14 is axially movable with regard to the lower portion 2 of the brewing chamber 14, whereby the upper portion 3 is biased by a spring 4 pressing the upper portion 3 of the chamber into the position shown in FIG. 1 against a stop member. For closing the brewing chamber 14, first, the brewing chamber housing 1 is swiveled and then raised against a piston member not shown in the view according to FIG. 1. The drive means required for moving the brewing chamber housing 1 are not shown. The top side of the upper portion 3 of the chamber is provided with a circumferential sealing member 6 on which is resting the edge 12 of the cartridge 10 containing the coffee powder to be brewed. The feeding of the cartridge 10 into the brewing chamber 14 is performed by not further shown means. At the bottom of the brewing chamber 14, three perforator members 8 in the shape of inclined knives are located which are adapted to perforate the back side of the cartridge 10. However, in this sectioned view, only two of the three perforator members 8 are visible.

Figure 2:
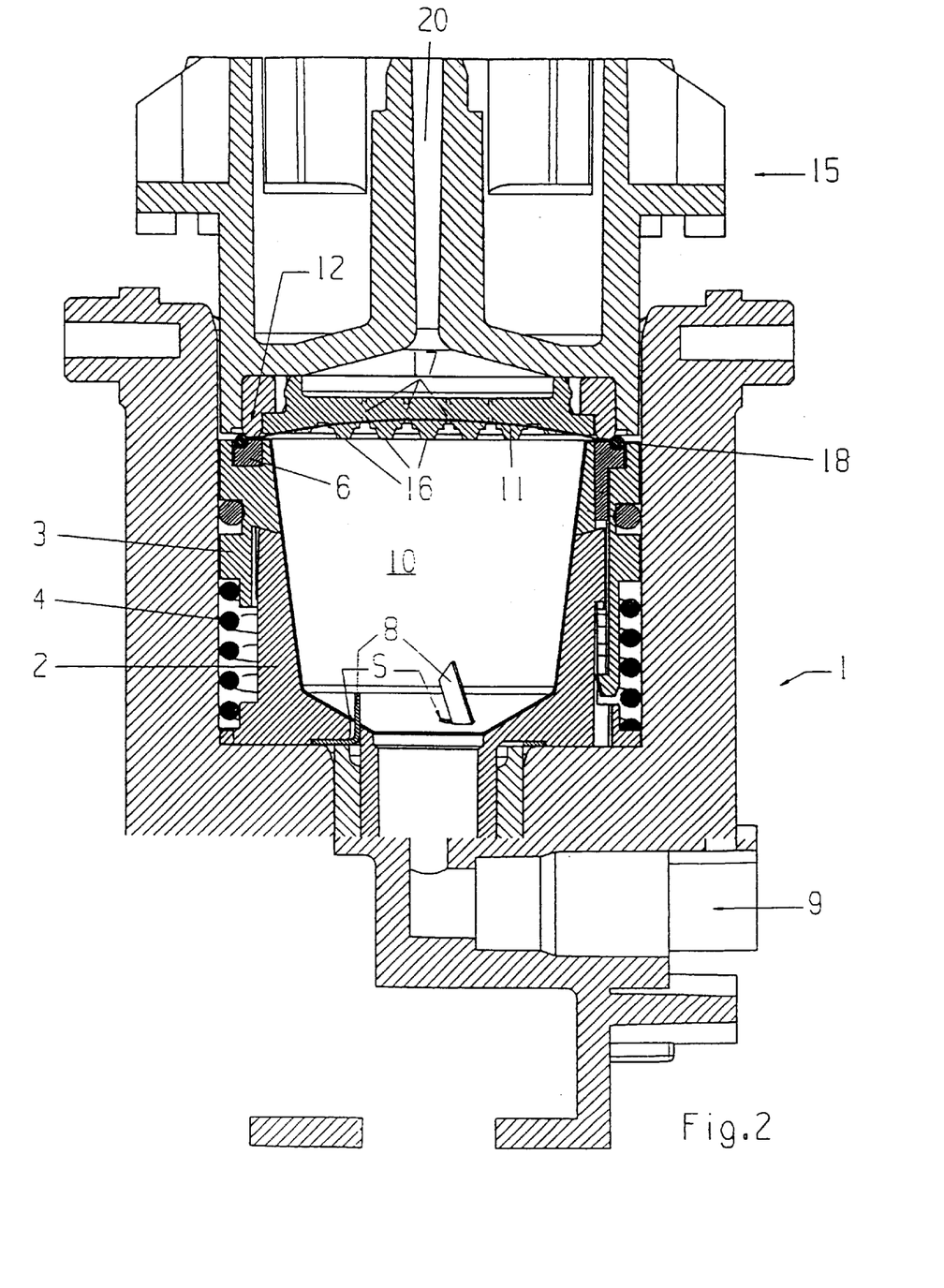
FIG. 2 shows the brewing assembly during the closing of the chamber.

FIG. 2 shows the brewing assembly in the brewing position. For this purpose, the brewing chamber housing 1 has been swiveled and raised against the piston member 15 visible in this illustration whose front side is provided with a plurality of projections 16 as well as with a circumferential sealing member 18. Upon raising the brewing chamber housing 1, the piston member 15 enters the brewing chamber housing 1 and abuts on the upper portion 3 of the brewing chamber such that the latter is pressed downwards, together with the cartridge 10, against the force of the spring 4. Thereby, the perforator members 8 penetrate the cartridge 10 from the lower side and provide the latter one with slots S. Due to the fact that the knife-shaped perforator members 8 are inclined, the bottom of the cartridge 10 is provided with elongated slots S that are longer than the corresponding perforator member 8. In the upper end position of the brewing chamber housing 1, the lower side of the upper portion 3 of the brewing chamber abuts against the upper side of the lower portion 2 of the brewing chamber. For feeding the brewing water, a channel 9 is provided that opens centrally into the bottom of the brewing chamber 14.

In the upper end position of the brewing chamber housing 1, the sealing member 18 of the piston member 15 sealingly engages the edge portion 12 of the cartridge 10, and simultaneously the sealing member 6 of the upper portion 3 of the brewing chamber sealingly engages the lower side of the edge portion 12 of the cartridge, such that the front portion of the cartridge is hydraulically sealed with regard to the rear portion of the cartridge. As can be seen from the illustration of FIG. 2, the inner side of the brewing chamber 14 is adapted to the shape of the cartridge 10, such that no significant gap between outside of the cartridge and inside of the brewing chamber exists.

Once the cartridge having been perforated at its rear side and once the front portion of the cartridge having been sealed with regard to the rear portion of the cartridge, brewing water can be fed through the channel 9. This brewing water creates a hydraulic overpressure in the brewing chamber 14 which presses the cartridge upwards against the projections 16 of the piston member 15, such that the projections 16 of the piston member 15 penetrate the cap 11 of the cartridge 10 and perforate it. Now, the brewing water can flow into the interior of the cartridge 10 through the slots S created by the perforator members 8. Due to the fact that the water enters the cartridge 10 from the outside and is not fed through a brewing pin member from the interior, as is usual up to now, it can be ensured that no coffee powder contaminating the coffee machine is flushed out of the cartridge 10 during the brewing operation. The brewed coffee beverage can escape through the cap 11 of the cartridge 10 and flows through channels 17 provided in the piston member 15 into the outlet channel 20, from where it flows to a not further shown coffee beverage outlet.

Figure 3:
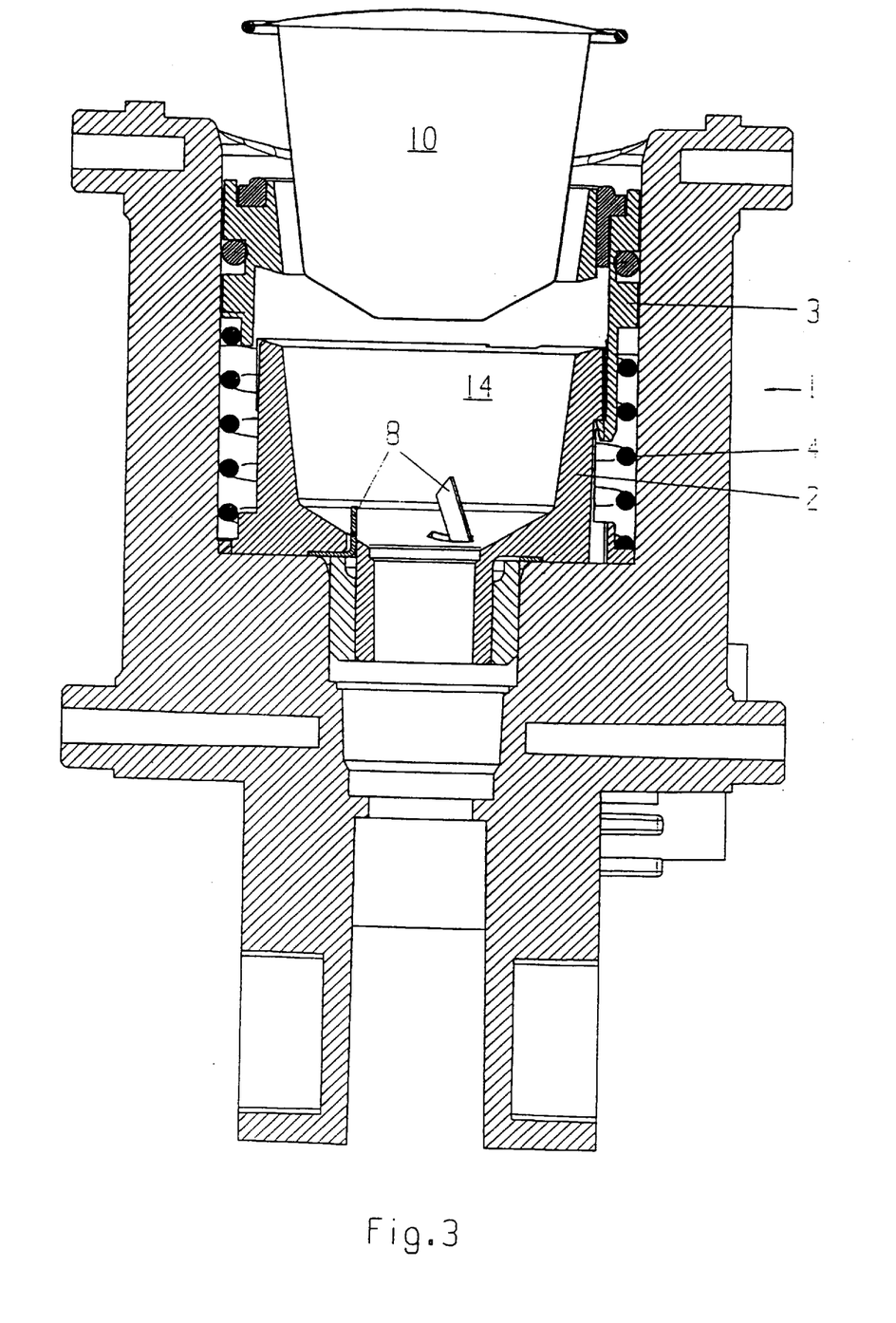
FIG. 3 shows the brewing assembly in the brewing position.

After the brewing of the coffee powder portion, the brewing chamber housing 1 is moved downwards again and swiveled into the initial position. Now, the cartridge 10 containing extracted coffee powder is ejected from the brewing chamber housing 1 (FIG. 3) by not further shown means and fed to a collecting container. Also during the removal of the cartridge 10, it is advantageous if its rear side is not provided with one or several openings having a large cross section through which coffee grounds could fall out during ejecting the cartridge, or through which residual water containing coffee grounds could escape from the cartridge.

Figure 4A:
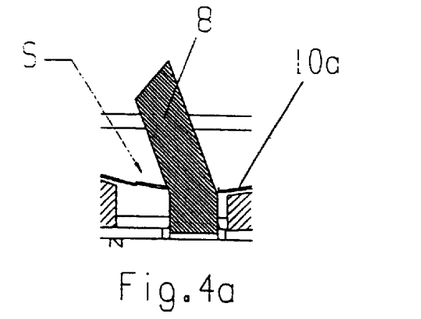
FIGS. 4a and 4b each show an enlarged view of a puncturing member.
Figure 4B:
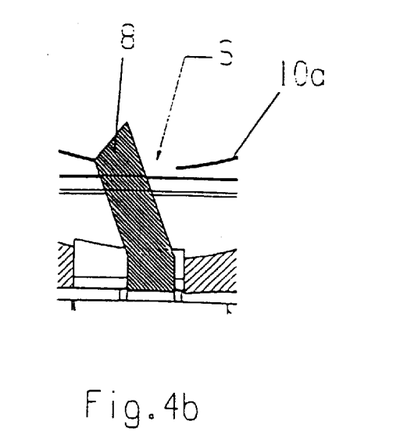

The FIGS. 4a and 4b show a perforator member 8 in an enlarged illustration, whereby FIG. 4a shows the perforator member 8 together with the rear portion 10a of the cartridge prior to the real brewing operation, and FIG. 4b during the real brewing operation. Under the influence of the hydraulic overpressure in the brewing chamber during the brewing operation, the brewing chamber portions are pressed apart from each other, resulting in a relative movement between cartridge and perforator members in the amount of up to 1 Millimeter. Due to the inclined configuration of the perforator members 8, however, this is of no influence on the inlet cross section of the slot S available to the brewing water. While the brewing water can flow into the cartridge in the situation shown in FIG. 4a predominantly through that portion of the slot S which is at the front side of the perforator member, the brewing water can flow into the cartridge in the situation shown in FIG. 4b predominantly through that portion of the slot S which is at the rear side of the perforator member.

By perforating the bottom of the cartridge 10 at three locations distributed along a circle, hydraulic dead volumina in the interior of the cartridge 10 are avoided to the greatest extent and the coffee powder received in the cartridge is homogeneously exposed to the brewing water.

Figure 5:
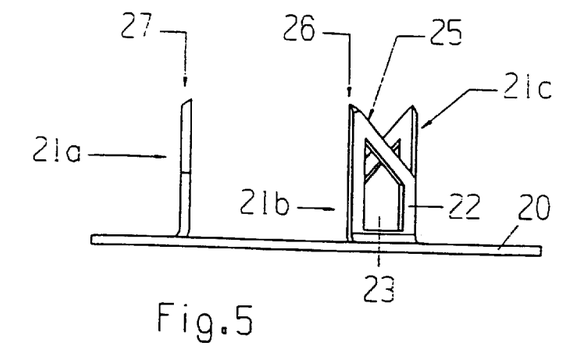
FIG. 5A shows an alternative embodiment of a perforator member.
FIG. 5B shows another alternative embodiment of a perforator member.
FIG. 5C shows another alternative embodiment of a perforator member.
Figure 5A:
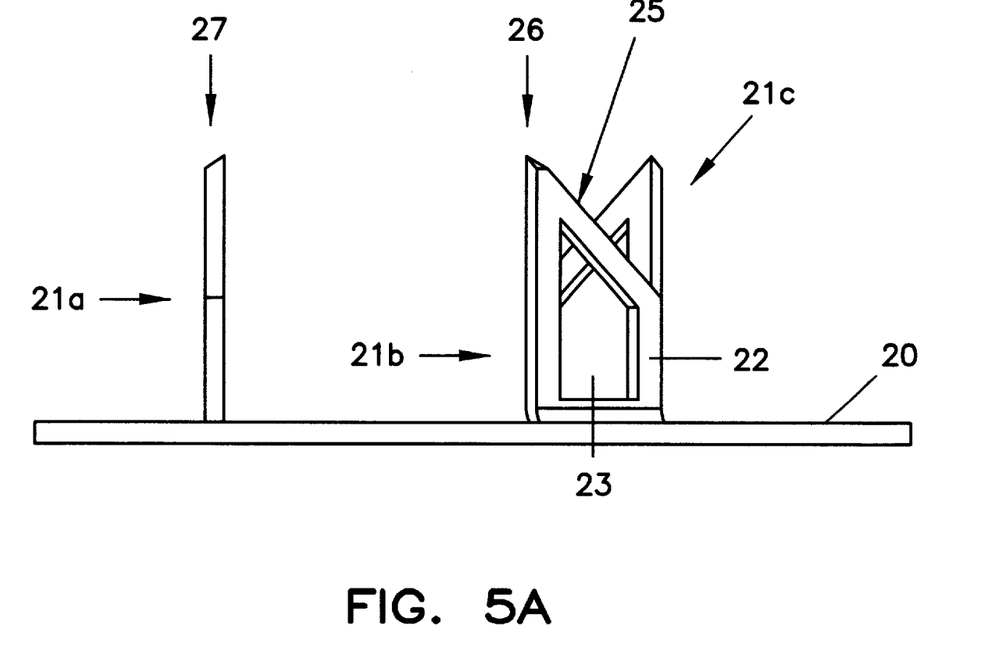

FIG. 5A shows an alternative embodiment of perforator members 21a, 21b and 21c that are located on an annular base member 20. Again, the perforator members 21a, 21b and 21c are evenly distributed along a circle. Each perforator member, for example also the perforator member 21b, comprises a frame member 22 having trapezoidal shape with an inclined, upper cutting edge 25. As can be seen in the view of the left perforator member 21a, the cutting edge 25 forms the upper end of an also inclined cutting face 27. At the tip of the particular perforator member 21b, a triangular perforator face 26 is located. The frame member 22 constituting the particular perforator member 21b is provided with a centrally located aperture 23. As soon as the perforator members 21a, 21b and 21c have perforated the cartridge, brewing water can be supplied to the interior of the cartridge through the apertures 23.

It is understood that the shown brewing assembly is for example only and is not to be considered as final at all. For example, instead of providing perforator members fixedly mounted to the bottom of the brewing chamber, perforator members could be provided that are moved into the brewing chamber by drive means for perforating the cartridge and are retracted, after perforating it, back into a rest position. Another embodiment can be seen in a design in which the perforator members are guided and moved in such a way that they create, upon perforating the cartridge, an opening that is larger than the perforator members themselves. Also the number, arrangement and design of the perforator members could vary within a wide region. For example, also perforator members could be used that have a dragon shaped design or have the shape of a double cone.

Figure 5B:
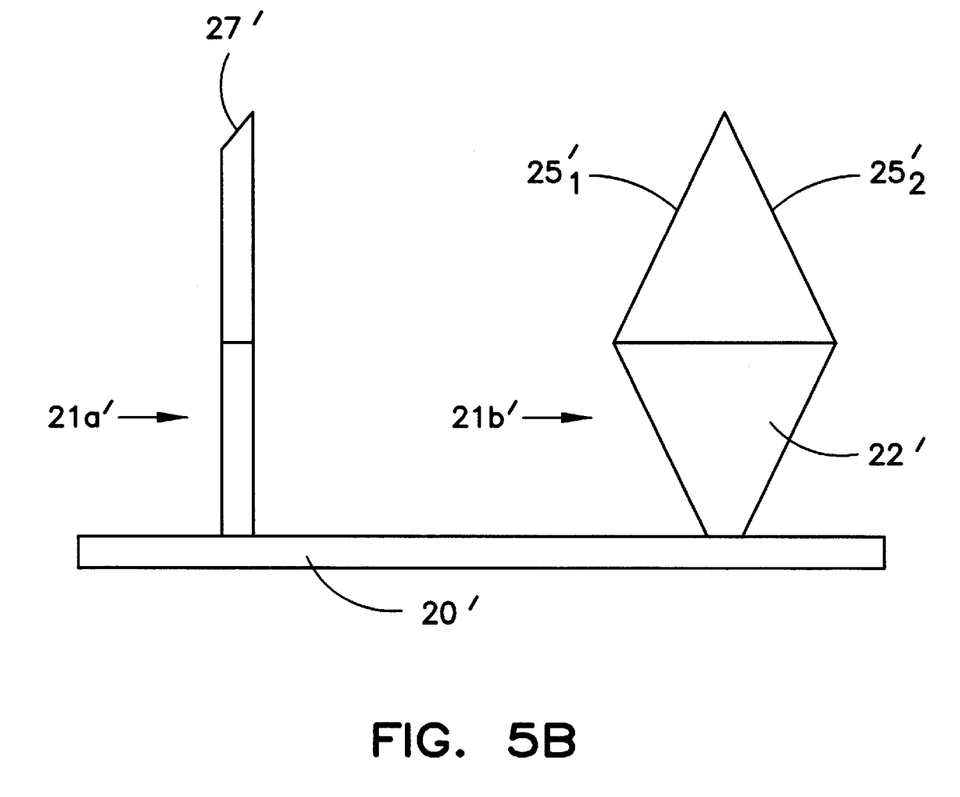

FIG. 5B shows another alternative embodiment of perforator members $21a'$, $21b'$ and $21c'$ (not shown but behind $21b'$) that are located on an annular base member $20'$, the perforator members $21a'$, $21b'$ and $21c'$ being dragon-shaped. Again, the perforator members $21a'$, $21b'$ and $21c'$ are evenly distributed along a circle. Each perforator member, for example also the perforator member $21b'$, comprises a frame member $22'$ having a dragon shape with inclined, upper cutting edges $25_1'$ and $25_2'$. As can be seen in the view of the left perforator member $21a'$, the cutting edge $25'$ forms the upper end of an also inclined cutting face $27'$. This embodiment is adapted to create an opening in the bottom of the cartridge means having a cross sectional area greater than the (average) cross sectional area of the perforator means. Stated another way, since the cross sectional area of the perforator members decreases against the lower end, the perforator means has a(n) (average) cross sectional area smaller than the cross sectional area of an opening with the perforator means in the cartridge bottom of the cartridge means.

Figure 5C:
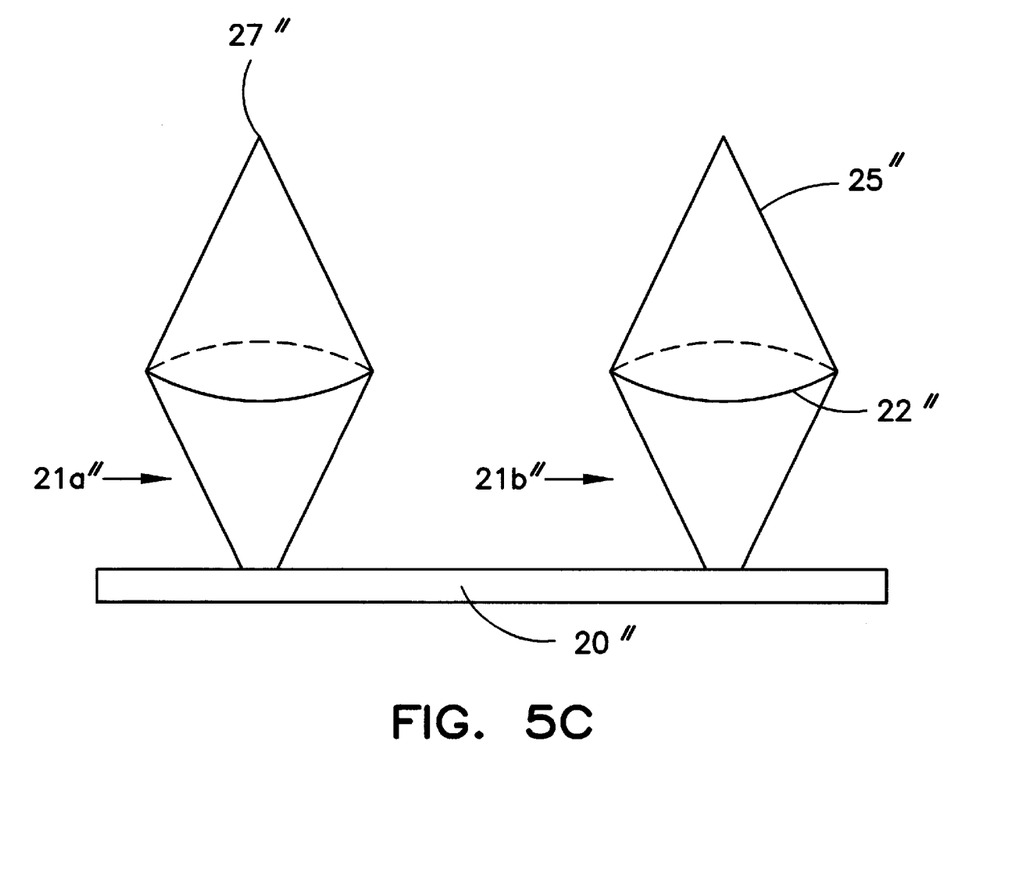

FIG. 5C shows another alternative embodiment of perforator members $21a''$, $21b''$ and $21c''$ (not shown but behind $21b''$) that are located on an annular base member $20''$, the perforator members $21a''$, $21b''$ and $21c''$ being double-cone shaped. Again, the perforator members $21a''$, $21b''$ and $21c''$ are evenly distributed along a circle. Each perforator member, for example also the perforator member $21b''$, comprises a frame member $22''$ having a multiple cone shape (one cone atop another, inverted cone) with a cone-shaped cutting edge $25''$. As can be seen in the view of the left perforator member $21a''$, the cutting edge $25''$ forms the upper end of an also inclined cutting face $27''$. This embodiment is adapted to create an opening in the bottom of the cartridge means having a cross sectional area greater than the (average) cross sectional area of the perforator means. Stated another way, since the cross sectional area of the perforator members decreases against the lower end, the perforator means has a(n) (average) cross sectional area smaller than the cross sectional area of an opening with the perforator means in the cartridge bottom of the cartridge means.

The advantages of the shown assembly both generally and as compared to known assemblies provided with a brewing pin member can be summarized as follows:

Minor contamination of the coffee machine due to small perforations;

No flushing of coffee powder:

No hydraulic dead volumina in the interior of the cartridge;

Homogenous flow of brewing water through the coffee powder and homogenous brewing thereof;

No blocking of apertures for feeding brewing water, thus no requirement for cleaning the same;

Insensitive with regard to expansions of the brewing chamber and displacement of the cartridge, respectively, caused by a hydraulic overpressure in the brewing chamber;

Well defined entry openings for the brewing water;

Simple design and low manufacturing costs.

What is claimed is:

1. Coffee machine for brewing coffee powder pre-packed in a cartridge means having a cartridge bottom, comprising:

perforator means for creating at least one opening in said cartridge means, said opening having a cross sectional area;

said perforator means being adapted to create said opening in said cartridge bottom of said cartridge means;

said perforator means having a cross sectional area smaller than said cross sectional area of said opening created in said cartridge bottom of said cartridge means; and means for feeding brewing water under overpressure through the free cross sectional area of said opening in said cartridge bottom of said cartridge means into the interior of said cartridge means.

2. Coffee machine according to claim 1 in which said perforator means comprises inclined perforator members which create an opening whose cross section is greater than the mean cross section of the particular perforator member.

3. Coffee machine according to claim 1 in which said perforator means comprises a frame shaped perforator member having a centrally located cut-out through which the brewing water is fed into the interior of said cartridge means.

4. Coffee machine according to claim 1 in which said perforator means comprises a trapezoidal perforator member, having an inclined cutting edge means directed towards the bottom of said cartridge means.

5. Coffee machine according to claim 1 in which said perforator means comprises a dragon shaped perforator member.

6. Coffee machine according to claim 1 in which said perforator means comprises a perforator member in the shape of a double cone.

7. Coffee machine according to claim 1 in which a chamber for receiving said cartridge means as well as perforator members projecting or movable into said chamber are provided, and in which means for perforating the front portion of said cartridge means and means for hydraulically sealing the said front portion of said cartridge means with regard to the rear portion of said cartridge means are provided, whereby said chamber is adapted to be hydraulically subjected to overpressure in such a way that the brewing water flows through said openings into the interior of said cartridge means.

8. Coffee machine according to claim 1, in which said chamber portions delimiting said chamber and/or said closure member are axially movably arranged, and in which said cartridge means is movable with regard to said perforator means by the axial movement upon closing said chamber in such a way that said perforator means penetrate said cartridge means.

9. Coffee machine according to claim 1, further comprising a brewing chamber housing means receiving two chamber portions delimiting said chamber, whereby an upper chamber portion of said two chamber portions is provided for vertically supporting said cartridge means and is biased by means of a spring means in such a way that it is axially movable, upon closing said chamber, with regard to a lower chamber portion of said two chamber portions and against the force of said spring means.

10. Coffee machine according to claim 7 in which the inner shape of said chamber essentially corresponds to the outer shape of said cartridge means.

11. Coffee machine according to claim 8, further comprising a brewing chamber housing means receiving two chamber portions delimiting said chamber, whereby an upper chamber portion of said two chamber portions is provided for vertically supporting said cartridge means and is biased by means of a spring means in such a way that it is axially movable, upon closing said chamber, with regard to a lower chamber portion of said two chamber portions and against the force of said spring means.

* * * * *